Jan. 4, 1949.  E. A. HULBERT  2,457,999
LUBRICATION MEANS FOR DUAL PROPELLOR SHAFT ASSEMBLIES
Filed March 28, 1946
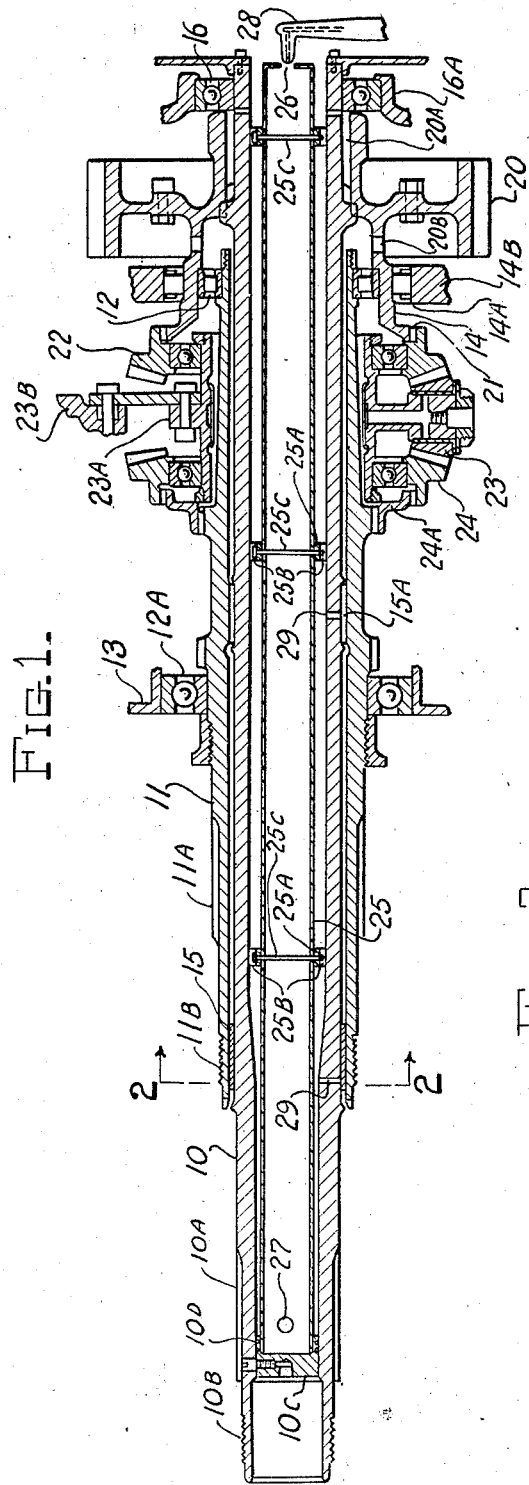
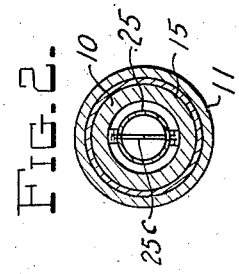
INVENTOR.
Edward A. Hulbert
BY
Hanke & Hardesty
ATTORNEYS Patented Jan. 4, 1949

2,457,999

UNITED STATES PATENT OFFICE 2,457,999

LUBRICATION MEANS FOR DUAL PROPELLER SHAFT ASSEMBLIES

Edward A. Hulbert, Detroit, Mich., assignor to Continental Aviation and Engineering Corporation, Detroit, Mich., a corporation of Virginia Application March 28, 1946, Serial No. 657,805

5 Claims. (Cl. 184—6)

1

The present invention relates to propeller-shaft assemblies for dual propellers having coincident axes of rotation and relates more specifically to lubricating means therefor.

Heretofore, in the lubrication of such assemblies, it has been the practice to rely upon the vapor and spume from the oil in the engine crankcase for the lubrication of bearings supporting the one shaft in the other but, because of the fact that there is always a considerable proportion of water vapor in such vapor and spume and because of the condensation of such water, the lubrication has not been efficient and has even resulted in corrosion.

Among the objects of the invention is the overcoming of such difficulties and the provision of means to supply liquid lubricant to such bearings.

Another object is means to supply such liquid lubricant in sufficient quantity to preclude corrosion by the water content.

Still other objects and advantages will be apparent to those skilled in the art upon reference to the following description and the accompanying drawings in which Fig. 1 is a longitudinal central sectional view of a shaft assembly involving the present invention.

Figure 2 is a sectional view on line 2—2 of Fig. 1.

In the drawing, there are shown at 10 and 11 the inner and outer of two tubular concentric shafts. The inner shaft 10 on its projecting or outboard portion is provided with splines 10A and threads 10B by means of which a suitable propeller (not shown) may be mounted on and driven by the shaft. Likewise the shaft 11 is provided with splines 11A and threaded portion 11B for the mounting of a second propeller (not shown).

The outer shaft 11 is mounted for rotation in suitable antifriction bearings 12 and 12A, the latter being suitably supported in a fixed portion 13 of the housing in which the mechanism is mounted.

The bearing 12 is mounted in an annular member 14, itself rotatably mounted in a suitable bear 14A supported in a fixed portion 14B of the housing.

The inner shaft 10 is of such length as to project from both ends of shaft 11 and, as stated above, provided at its forward end with a propeller mounting.

That portion of shaft 10 within shaft 11 is supported therein in a plain bearing 15, located in the forward or outboard end of shaft 11, and a needle bearing 15A located at an intermediate

2 point in shaft 11, while the rear projecting portion of shaft 10 is mounted in a suitable bearing 16 supported by a fixed member 16A.

The two shafts 10 and 11 are driven in opposite directions through the mechanism shown from the main drive gear 20.

This drive gear 20 is splined as at 20A upon the shaft and drives the latter directly.

Gear 20 is connected in driving relation to the annular member 14 by the interlocking tooth connection shown at 20B and the member 14 through splines 21 is connected in driving relation to beveled ring gear 22.

Ring gear 22 meshes with and drives a plurality of small bevel gears 23 mounted in a spider 23A fixed against rotation by being attached to a stationary member 23B. The gears 23 mesh also with a second beveled ring gear 24 splined to shaft 11 through an intermediate member 24A.

The outer end of shaft 10 is closed by means of a suitable plug 10C which is provided with an inwardly extending flange 10D and within shaft 10 is mounted a thin walled tube 25 supported in concentric relation and spaced from the inner wall of the shaft by the flange 10D and spaced rings 25A, the latter being provided with notches 25B to allow longitudinal oil flow and held in place by suitable pins 25C.

The forward or outboard end of tube 25 is closed by the plug 10D while the rear end is partially closed but provided with a small concentric opening 26. Small openings 27 are also provided near the forward end of the tube.

Opposite the opening 26 and arranged to direct a jet of oil into the inboard end of the tube at its axis is a nozzle 28, the oil being supplied from the conventional oil pressure line (not shown). And, at the locations of bearings 15 and 15A, suitable passages 29 through the wall of shaft 10 lead to these bearings.

In the operation of the lubricating means, oil injected by nozzle 28, will partially fill the rear end of the tube 25 and through the action of centrifugal force move along the tube to the forward end and out through openings 27 into the space around the tube. The oil passing freely out of openings 27 again builds a body of oil in the end of shaft 10, and again centrifugal force causes flow along the inner wall of shaft 10 toward the rear end, some of it entering bearings 15 and 15A through the passages 29 and the excess spilling back into the crankcase or housing through the open rear end of shaft 10.

The oil from nozzle 28, coming from the engine lubricating system will be quite hot when it enters the tube 25 and, as a consequence of this heat and of the plentiful flow, no condensate of water can collect in the shafts or bearings.

Although I have illustrated but one form of the invention, and have described in detail but a single application thereof, it will be apparent to those skilled in the art to which the invention pertains, that various modifications and changes may be made therein without departing from the spirit of my invention or from the scope of the apended claims.

I claim:

1. A shaft assembly for dual propellor drive consisting of a pair of concentric tubular shafts, bearings in the outer shaft in which the inner shaft is mounted for rotation and means for lubricating said bearings, said lubricating means consisting of means for continuously supplying lubricant at the rearward end of said inner shaft and means for conveying liquid lubricant to the forward end of said inner shaft, means providing for return flow of said lubricant along the inner wall of said inner shaft and passageways from said inner wall to said bearings.

2. A shaft assembly for dual propellor drive consisting of a pair of concentric tubular shafts, bearings in the outer shaft in which the inner shaft is mounted for rotation and means for lubricating said bearings, said lubricating means consisting of means enclosed in the inner shaft for conveying liquid lubricant to the forward end of said inner shaft, means for continuously supplying such lubricant to the rearward end of said inner shaft means providing for return flow of said lubricant along the inner wall of said inner shaft and passageways from said inner wall to said bearings.

3. A shaft assembly for dual propellor drive consisting of a pair of concentric tubular shafts, bearings in the outer shaft in which the inner shaft is mounted for rotation and means for lubricating said bearings, said lubricating means consisting of a tube concentric with but spaced from the inner wall of the inner shaft and extending substantially the length thereof, there being openings in said tube adjacent one end and passages from said inner wall to said bearings, and means for supplying oil to the other end of said tube.

4. A shaft assembly for dual propellor drive consisting of a pair of concentric tubular shafts, bearings in the outer shaft in which the inner shaft is mounted for rotation and means for lubricating said bearings, said lubricating means consisting of a tube concentric with but spaced from the inner wall of the inner shaft and extending to the outboard end of said shaft, there being openings in said tube adjacent said outboard end and passages from said inner wall to said bearings, means for establishing a relatively considerable body of oil in the inboard end of said tube.

5. A shaft assembly for dual propellor drive consisting of a pair of concentric tubular shafts, bearings in the outer shaft in which the inner shaft is mounted for rotation and means for lubricating said bearings, said lubricating means consisting of a tube mounted concentrically in but in spaced relation to the inner shaft, said tube extending substantially the full length of said shaft and having oil exit openings adjacent the forward end and also having a closure for its rearward end, said closure being provided with a relatively small central opening, passageways through the wall of said inner shaft opposite the bearings, and means for forcing a jet of liquid lubricant into said tube through said central opening.

EDWARD A. HULBERT.

REFERENCES CITED

The following references are of record in the file of this patent:

UNITED STATES PATENTS

| Number | Name | Date |
|---|---|---|
| 1,921,893 | Steele | Aug. 8, 1933 |
| 2,165,448 | Browne | July 11, 1939 |
| 2,190,254 | Caproni | Feb. 13, 1940 |
| 2,395,097 | Buck | Feb. 19, 1946 |

FOREIGN PATENTS

| Number | Country | Date |
|---|---|---|
| 716,306 | France | Oct. 6, 1931 |
| 844,172 | France | Apr. 17, 1939 |